United States Patent [19]

Teller

[11] Patent Number: 6,051,199
[45] Date of Patent: Apr. 18, 2000

[54] INTEGRATED CATALYTIC/ADSORPTION PROCESS FOR DESTROYING VOLATILE ORGANIC COMPOUNDS

[75] Inventor: Aaron J. Teller, Palm Beach Garden, Fla.

[73] Assignee: Regenerative Environmental Equipment Co., Inc., Branchburg, N.J.

[21] Appl. No.: 08/854,324

[22] Filed: May 12, 1997

[51] Int. Cl.[7] .................................................. B01D 53/72
[52] U.S. Cl. .................................... 423/245.1; 423/245.3; 588/205; 95/113; 95/141; 95/143
[58] Field of Search .............................. 423/245.1, 245.3; 588/205; 95/113, 141, 143; 96/125

[56] References Cited

U.S. PATENT DOCUMENTS

| | | | |
|---|---|---|---|
| 4,661,329 | 4/1987 | Suzuki et al. | 423/245 |
| 4,834,962 | 5/1989 | Ludwig | 423/351 |
| 5,254,512 | 10/1993 | Ueda et al. | 502/52 |

FOREIGN PATENT DOCUMENTS

| | | | |
|---|---|---|---|
| 1-249124 | 10/1989 | Japan | 95/141 |
| 5-301013 | 11/1993 | Japan . | |

Primary Examiner—Steven P. Griffin
Assistant Examiner—Timothy C Vanoy
Attorney, Agent, or Firm—Howrey Simon Arnold & White, LLP; Michael J. Bell; Paul D. Roath

[57] ABSTRACT

A method for removing volatile organic compounds (VOCs) from an effluent or exhaust stream produced by an industrial or commercial process that allows for both adsorption and catalytic destruction of the VOCs. The method utilizes a bed containing both adsorbent material and catalytic material, either as an admixture or as separate layers of the two materials. During the preferred mode of operation, one section of the bed collects VOCs from the effluent while simultaneously, in another section of the bed, collected VOCs are destroyed and the bed material is regenerated. This process can continuously eliminate VOCs from an effluent without interruption by rotating the bed through the adsorption and regeneration zones or by rotary feeding of the effluent and an oxygen containing gas to different portions of the bed.

20 Claims, 4 Drawing Sheets

INTEGRATED CATALYTIC/ADSORPTION PROCESS FOR DESTROYING VOLATILE ORGANIC COMPOUNDS

This invention is related to commonly-assigned, U.S. application Ser. No. 08/276,645, filed on Jul. 19, 1994, now U.S. Pat. No. 5,510,895 the disclosure of which is incorporated by reference herein.

BACKGROUND OF THE INVENTION

Field of Invention

The invention relates in general to an improved pollution control device to destroy volatile organic compounds ("VOCs") contained in the exhaust or effluent of industrial and commercial processes. More particularly, it relates to a unit having a bed that includes both adsorbent and catalytic material that permits removal of VOCs from an effluent while simultaneously catalytically converting the VOCs into carbon dioxide and water.

Related Art

Systems to treat VOCs contained in the effluent of industrial processes are known. Conventional VOCs control systems typically utilize combustion processes for the conversion of VOCs into non-noxious compounds, such as carbon dioxide and water, as well as noxious compounds, such as nitrogen oxides and inorganic acids. Traditional combustion processes include: (1) thermal destruction of the VOCs; (2) thermal destruction of the VOCs with heat recovery; (3) catalytic thermal destruction of the VOCs and (4) a three-step process where first VOCs are removed from a waste stream and concentrated using an adsorbent, then the adsorbent is regenerated using a smaller quantity of air or other gas which creates a concentrated process stream, and finally the VOCs are destroyed in an additional processing unit. The thermal requirement and complexity of equipment needed for these various processes relative to basic thermal destruction are shown in Table 1 below. This table illustrates that improved thermal efficiency is typically correlated with increased process complexity for conventionally known systems. Hence, energy savings are achieved by employing complicated operations which have increased capital costs.

TABLE 1

| | | Relative Thermal Requirement | Relative Cost & Complexity (Range 1–5) |
|---|---|---|---|
| 1. | Thermal Destruction | 1 | 1 |
| 2. | Thermal Destruction with Heat Recovery | 0.65 | 3 |
| 3. | Catalytic Thermal Destruction | 0.4 | 2 |
| 4. | Concentration Followed by Thermal Destruction Using Two Separate Process Units | 0.2 | 5 |

Accordingly, an effective system is needed to destroy VOCs having both a relatively low cost-complexity factor and a relatively low thermal requirement. A review of related VOC treatment apparatus below shows that conventional pollution control devices do not satisfy this need.

One method of treating exhaust gas (in the automotive environment) as it increases in temperature from a low temperature (ambient) to normal operating temperature (>300° C.) is disclosed in U.S. Pat. No. 4,985,210 to Minami and U.S. Pat. No. 5,140,811 to Minami, et al. In this method, VOCs are initially collected in an adsorbent trapper when the automobile exhaust gas is at a low temperature. When the automobile exhaust gas reaches a temperature greater than 300° C., the VOCs from the automobile, as well as the VOCs desorbed from the adsorbent trapper, are catalytically converted into purified hydrocarbons in a second unit. Aside from being directed to the specialized field of automotive exhaust, this method suffers from several disadvantages, including higher thermal requirements and the necessity of two separate processing units.

Similar treatment systems are discussed in the patents to Patil et al., U.S. Pat. No. 5,125,231, and Dunne, U.S. Pat. Nos. 5,078,979 and 5,142,864, that serially treat automotive exhaust gases from a cold, start-up temperature to a normal operational temperature. Two phases are discussed: in the first phase, the gas temperature is lower than that which is necessary to achieve proper conversion in the catalytic reactor; and in the second stage, the gas temperature is such that proper catalytic conversion is possible. Patil ('231) discloses a catalytic converter that includes molecular sieves and a catalyst, yet disadvantageously requires a second catalytic converter. Therefore, these patents suffer from the same problems discussed above.

There are also patents that disclose continuous regeneration of adsorbent material. For example, U.S. Pat. No. 4,778,492 to Dawson discloses a rotatable drum having adsorbent material for adsorbing particular components of a gas stream. As the drum rotates, a portion of the filter media is passed through a liquid regenerating material that desorbs these particular collected components from the adsorbent material into a liquid flow stream. Another gas treatment device is shown in U.S. Pat. No. 3,183,649 to Teller, which discloses an apparatus for the separation of solvent vapors from noxious gases using a rotatable filter that is thermally desorbed using steam directed to one portion of the media.

The foregoing demonstrates that there is a need for an energy-efficient VOCs removal and destruction system that minimizes capital costs and process complexity, regenerates the adsorbent material without creating additional waste streams, and provides for an essentially uninterrupted operation.

SUMMARY OF THE INVENTION

The invention satisfies the need and avoids the drawbacks of the prior art by integrating the processes of concentrating and catalytic thermal destruction into a single processing unit. This invention lowers the thermal requirement to about 0.15 relative to a typical thermal requirement of about 1 while the complexity of the process is only increased to a level of about 1.5 relative to a basic VOC treatment apparatus. Ultimately this integration reduces the equipment size and capital cost of the system by about 50%.

One aspect of the present invention relates to a method for destroying volatile organic compounds contained in an effluent from an industrial or commercial process, which comprises: passing an effluent which contains volatile organic compounds over a portion of a bed which contains adsorbent material and catalytic material, to adsorb the volatile organic compounds; and passing an oxygen-containing gas over another portion of said bed to desorb and catalytically destroy the volatile organic compounds collected therein.

More particularly, the invention provides a method and apparatus for collecting and eliminating VOCs carried in the effluent of a process stream utilizing a homogenous or heterogeneous bed containing both adsorbent and catalytic materials. By this invention, VOCs are adsorbed in one portion of this bed while being simultaneously catalytically eliminated in another portion of the bed.

In operation, the effluent is concentrated in one portion of the bed via the process of low temperature adsorption. At this temperature the bed exhibits little to no catalytic activity. At the end of an adsorption cycle, this concentrated (VOCs-rich) portion of the bed is subjected to a heated, oxygen-containing gas stream that causes the desorption and catalytic destruction of the VOCs contained therein.

Another aspect of the invention relates to an apparatus for destroying volatile organic compounds contained in an effluent from an industrial or commercial process, the apparatus comprising:

(a) a housing having an effluent inlet and an effluent outlet;

(b) a bed containing adsorbent material and catalytic material for collecting and eliminating volatile organic compounds;

(c) an inlet adsorption chamber disposed upstream of said bed and in flow communication with the effluent inlet;

(d) an outlet adsorption chamber disposed downstream of said bed and in flow communication with the effluent outlet;

(e) an adsorption zone for collecting volatile organic compounds, said adsorption zone being defined by said inlet and outlet adsorption chambers; and (f) a regeneration zone for eliminating volatile organic compounds from a first portion of said bed while a separate second portion of said bed in said adsorption zone simultaneously collects volatile organic compounds from the effluent, said regeneration zone being disposed in the housing and sealed from the adsorption zone.

The invention may be carried out in a regenerative VOCs destroyer ("RVD") including a housing having effluent inlet and outlet ducts, heated gas inlet and outlet ducts, and a bed having adsorptive catalytic material to collect and eliminate VOCs. The bed divides the housing into an inlet adsorption chamber disposed upstream of the bed and in flow communication with the effluent inlet and an outlet adsorption chamber disposed downstream of the bed and in flow communication with the effluent outlet. The inlet and outlet adsorption chambers together define an adsorption zone wherein the bed material adsorbs the VOCs contained in the effluent. A regeneration chamber, disposed within the housing, is sealed from the adsorption chamber for desorbing and catalytically converting VOCs that have been adsorbed by the bed in the adsorption chamber. The bed divides the regeneration chamber into an inlet regeneration chamber disposed upstream of the bed and in flow 15 communication with the heated gas inlet and an outlet regeneration chamber disposed downstream of the bed and in flow communication with the heated gas outlet. The bed may be divided into segments that are periodically subject to adsorption of VOCs in the adsorption zone, and desorption and catalytic conversion of the VOCs in the regeneration zone by means for effecting relative rotation between the bed and the adsorption and regeneration zones. Such means may be a rotatable bed support mounted in the housing or a rotary feed system that sequentially directs effluent and heated gas to various portions of the bed.

The homogenous and heterogeneous beds of this invention contain both adsorbent and catalytic material that are capable of collection and elimination of VOCs contained in a process effluent stream.

At typical process stream temperatures, the bed material adsorbs VOCs and demonstrates little, if any, catalytic activity. When the bed is heated to higher temperatures, during regeneration, the VOCs are desorbed and catalytically converted into harmless gases.

DETAILED DESCRIPTION OF THE PREFERRED EMBODIMENTS

Figure 1:
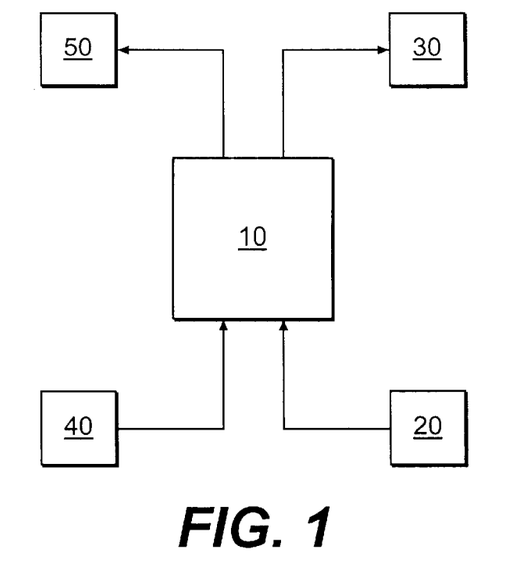
FIG. 1 is a process flow diagram illustrating the principles of the invention.

The invention will be discussed with reference to the accompanying drawings wherein like reference numerals have like meanings. FIG. 1 shows a general processing scheme of the invention having a regenerative volatile organic compound destroyer ("RVD") 10 depicted in the center of the figure. In one embodiment the RVD 10 is divided into two process zones and contains a bed containing adsorbent and catalytic processing material. An industrial or commercial process effluent 20, which contains volatile organic compounds ("VOCs"), is fed to a first processing zone of the RVD 10. In this zone VOCs are removed from the effluent using the adsorbent material of the bed, thereby emitting a VOCs-free effluent 30. The temperature in this zone is so low that the bed exhibits little to no catalytic activity and the VOCs are concentrated on the surface of the adsorbent materials in the bed.

Simultaneously, an oxygen-containing gas stream 40 such as air or pure oxygen, is fed to a second zone of the RVD where the catalytic oxidation-destruction of the VOCs occurs. The oxygen-containing gas stream is heated to at least the temperature necessary for initiating the catalytic reaction. Once the catalytic reaction is initiated, the bed will heat up, due to the exothermic oxidation reaction, to the operating temperature. The "previously adsorbed" VOCs are desorbed from the adsorbent material and catalytically converted into carbon dioxide and water to form a second VOCs-free stream 50. This second VOCs-free stream 50 may be later combined with VOCs-free effluent 30 and released to the atmosphere or utilized elsewhere in the process so that its energy content may be recovered. The simultaneous adsorption and conversion processes are accomplished through the relative movement between the processing material and the processing zones. This mechanism is described in greater detail below.

Figure 2A:
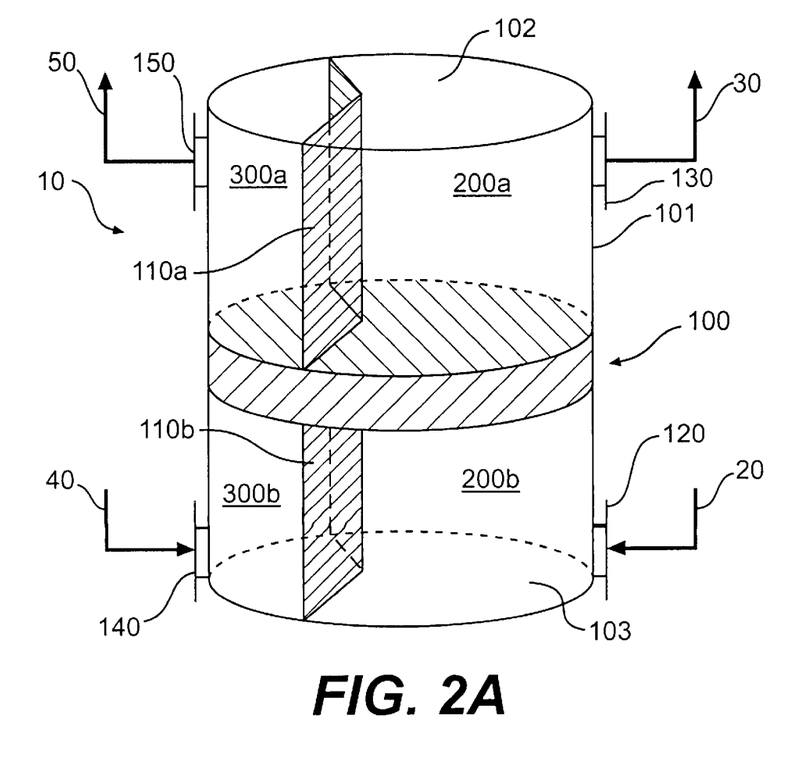
FIG. 2A is a perspective view of a regenerative VOC destroyer constructed according to the principles of the present invention, wherein the bed is divided into two processing zones; one for adsorption and one for regeneration.

FIG. 2A shows one embodiment of the RVD 10. The structure is shown as an upright cylindrical housing or shell 101 having a top wall 102, a bottom wall 103, an upper divider wall 110a, and a lower divider wall 110b. The divider walls (110a and 110b) are constructed such that the interior of the RVD 10 is divided into two processing zones: an adsorption zone 200 for removing VOCs from an effluent, which typically has the greater volume, and a regeneration zone 300 to desorb the VOCs from the adsorbent material and to catalytically convert the VOCs into harmless gases. A bed 100 is supported for rotation within the structure of the RVD 10 and contains adsorbent and catalytic processing material 400 for the collection and elimination of VOCs. The bed 100 divides the RVD 10 into upper and lower portions wherein the lower portion consists of inlet chambers 200b, 300b that receive incoming streams prior to treatment and the upper portion consists of outlet chambers 200a, 300a that conduct the outgoing post-treatment streams from the RVD 10 to downstream devices or the atmosphere.

In this embodiment, dividing walls (110a and 110b) and bed 100 define four chambers within RVD 10 that are described below. Regarding the adsorption zone 200, inlet adsorption chamber 200b is bounded by the housing 101, lower divider wall 110b, bottom wall 103, and the lower portion of bed 100; and outlet adsorption chamber 200a is defined by housing 101, upper divider wall 110a, top wall 102, and the upper portion of bed 100. The regeneration zone 300 also includes two process zones: inlet regeneration chamber 300b is bounded by the housing 101, lower divider wall 110b, bottom wall 103, and the lower portion of bed 100; and outlet regeneration chamber 300a is defined by the housing 101, upper divider wall 110a, top wall 102, and the upper portion of bed 100. These zones are sealed from each other and in fluid communication with different portions of the rotating bed at any given time during operation.

The operational relationship among these four chambers is described below. The effluent 20 is conducted to the RVD 10 through effluent inlet 120 into inlet adsorption chamber 200b and then to the rotating bed 100. After the rotating bed 100 removes the VOCs, through the process of adsorption, the VOCs-free effluent 30 is conducted through outlet adsorption chamber 200a to effluent outlet 130. At the same time a heated, oxygen-containing gas stream 40 is conducted to the RVD 10 through heated gas inlet 140 into inlet regeneration chamber 300b and then to rotating bed 100. The gas stream may be heated by any conventional heating apparatus known in the art. It may also be effective to heat the bed using electric heaters in the presence of oxygen. The heated gas stream 40 raises the temperature of the bed, desorbs the VOCs (thereby regenerating the bed), and catalytically converts the VOCs into harmless gases 50 that are then conducted through outlet regeneration chamber 300a to the atmosphere or other downstream device(s) through heated gas outlet 150. The bed 100 rotates through the adsorbent and regeneration zones in either a continuous or step-wise manner such that an effluent may be continuously treated in the adsorption zone and the processing material 400 may be continuously regenerated in the regeneration zone. The effluent may be conducted through the RVD 10 in any known manner, such as by the suction of an exhaust fan disposed downstream of the RVD 10 or by the positive pressure generated by a fan disposed upstream of the RVD 10.

Figure 3:
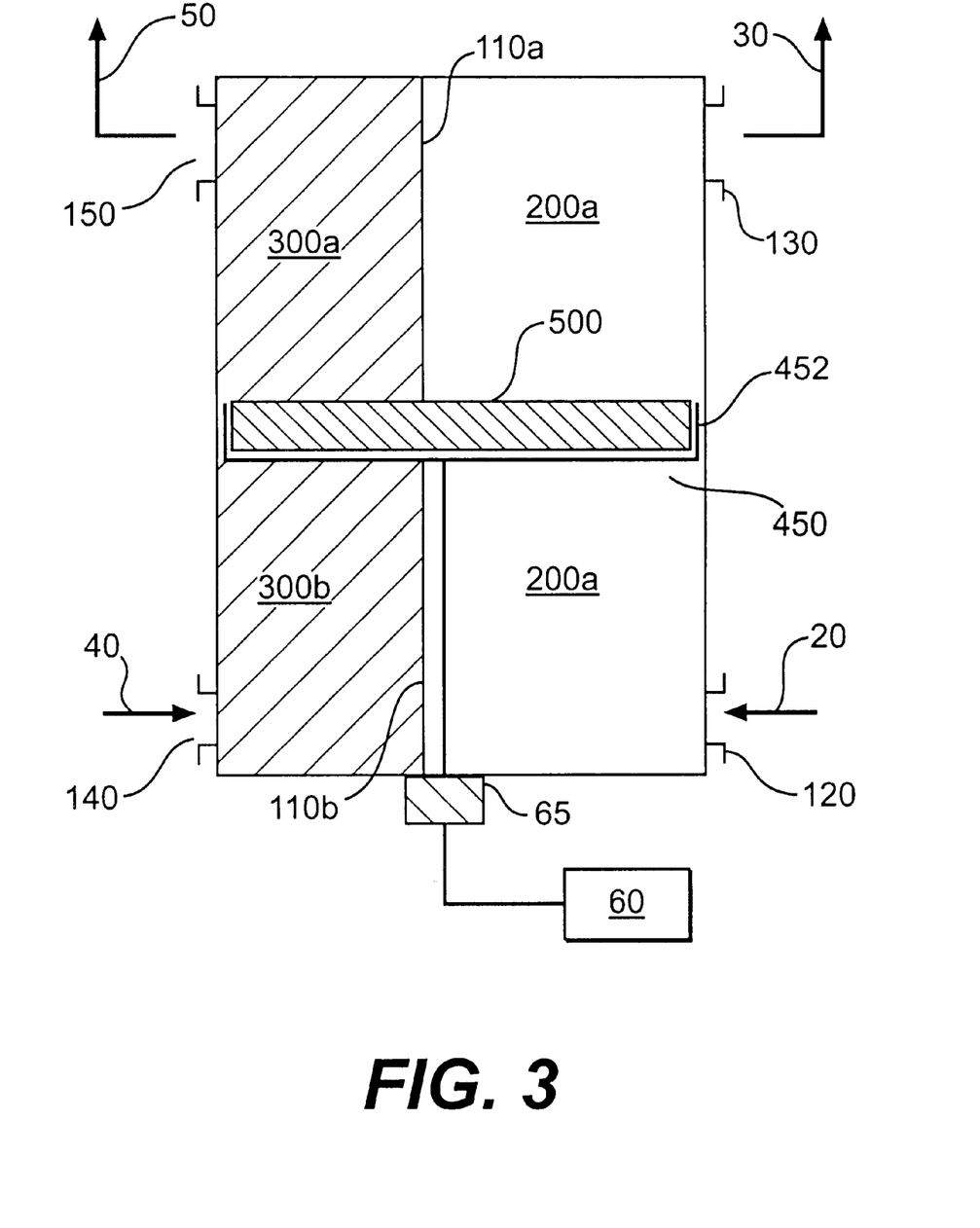
FIG. 3 is an elevational view of the regenerative VOC destroyer illustrated in FIG. 2A.

The structure of this embodiment of the invention is shown in greater detail in FIG. 3. A bed support 450 may be rotatably mounted within the RVD 10 such that it supports the processing material 500 found within bed 100. The outer periphery of the bed support 450 is disposed closely adjacent to the housing 101 and forms a seal such that process streams are unable to bypass the bed 100. Alternatively, a mechanical or fluid seal can be formed which is opened during movement of the bed and closed during operation.

One manner of effecting rotation of the rotating bed 100 is illustrated in which the bed support 450 is supported for rotation within the housing 101 by a bearing device 65. A drive mechanism 60 is provided for rotating the bed support 450 through various processing zones such as adsorption zone 200 and a regeneration zone 300 and can be driven in a continuous or step-wise manner by any conventional means known in the art. Of course, the bed 100 could be stationary and suitable structure, such as a rotary feed system, could be provided instead for sequentially directing the process flow streams to separate portions of the bed 100.

Figure 4:
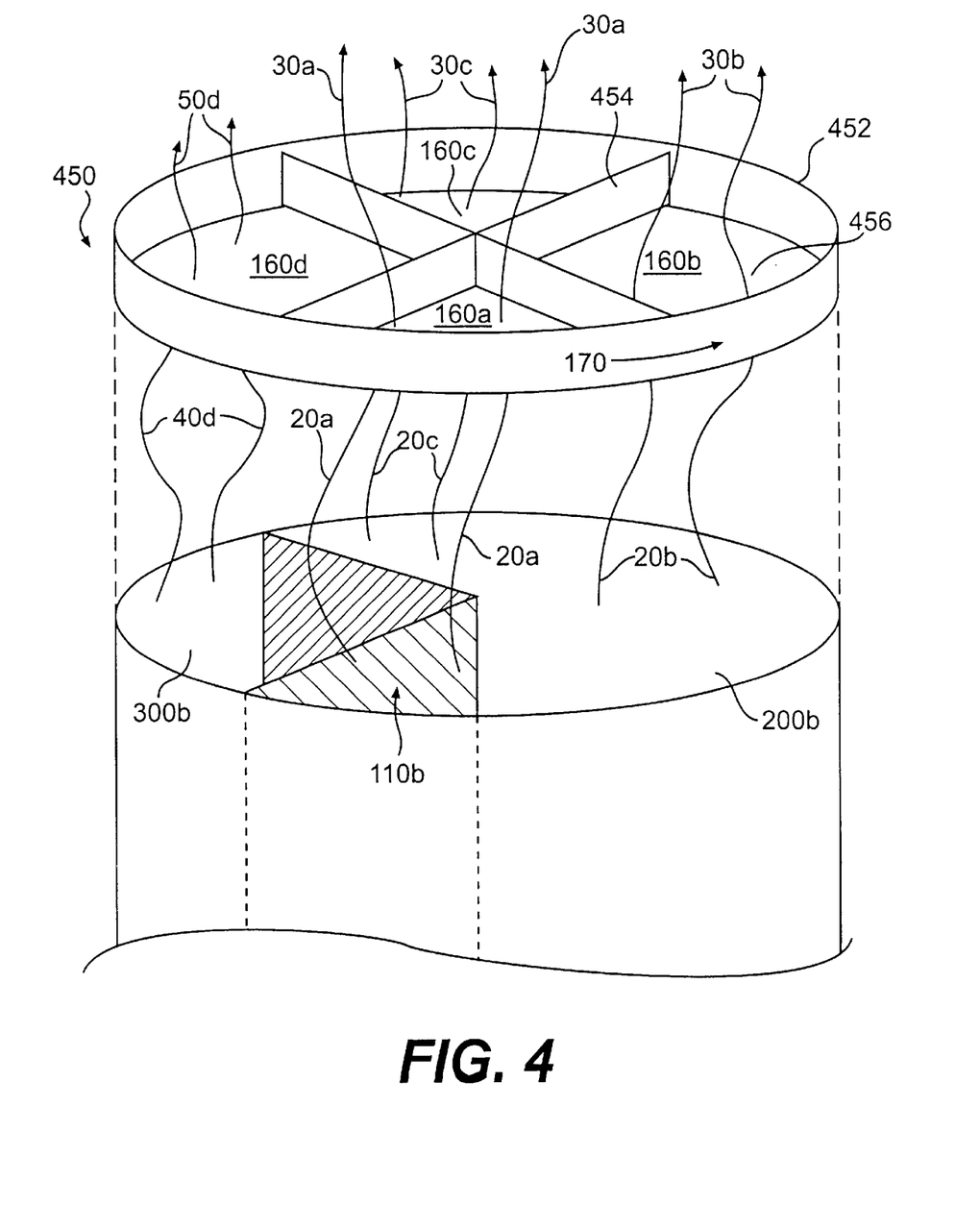
FIG. 4 is a perspective view of a rotatable bed support and the upper portion of the adsorption and regeneration chambers illustrating the individual processing segments and their spatial relationship to the inlet adsorbent and regeneration chambers.

The bed support 450 is more clearly illustrated in FIG. 4. The bed support 450 may be a wheel-like structure defining individual, triangular or pie-shaped processing segments 160 that support and retain the processing material 500. The bed support 450 includes an outer annular wall or rim 452 that is closely spaced to the inner surface of housing 101 as is shown in FIG. 3. Spoke-like radial walls 454 extend from the central portion of the support 450 to the rim 452 to divide the bed support into processing segments 160. An open, grate-like floor 456 is attached to the bottom portions of both the rim 452 and walls 454 that is strong enough to support the processing material 500 and sufficiently open to allow ample throughput of process flow streams. Such a mesh or porous material can be additionally provided above the processing material 500. Although the bed support 450 is shown in a horizontal position, it could be oriented in vertical or other positions.

The operation of this embodiment of the RVD 10 is discussed below. In the case of a step-wise rotation, at any one time three segments, e.g., 160a–160c, may be located within the adsorption zone 200 while one segment, e.g., 160d, may be disposed within the regeneration zone 300. This is depicted in FIG. 4 by effluent streams 20 and gas streams 40. Effluent streams 20a, 20b, 20c are transported from inlet adsorption chamber 200b and are treated in segments 160a, 160b, 160c, respectively. Conversely, gas streams 40d are conducted from inlet regeneration chamber 300b and operate upon segment 160d. After an adsorption cycle is complete the bed may be rotated one segment (90° in this embodiment). In this manner, a single revolution of the bed support 450 in the direction of arrow 170 represents four operational cycles. For example, during any four cycles segment 160a will spend three cycles in the adsorption zone 200 and one cycle in the regeneration zone 300. The precise size and number of segments and processing zones, as well as the retention time in a particular zone, may be varied based on the particular application and design considerations including the process operating conditions such as temperature and pressure, effluent and gas stream velocities and concentrations, adsorbent concentration and particle size, efficiency of the adsorbent and catalytic material, and characteristics specific to the regeneration of the adsorbent material.

Figure 2B:
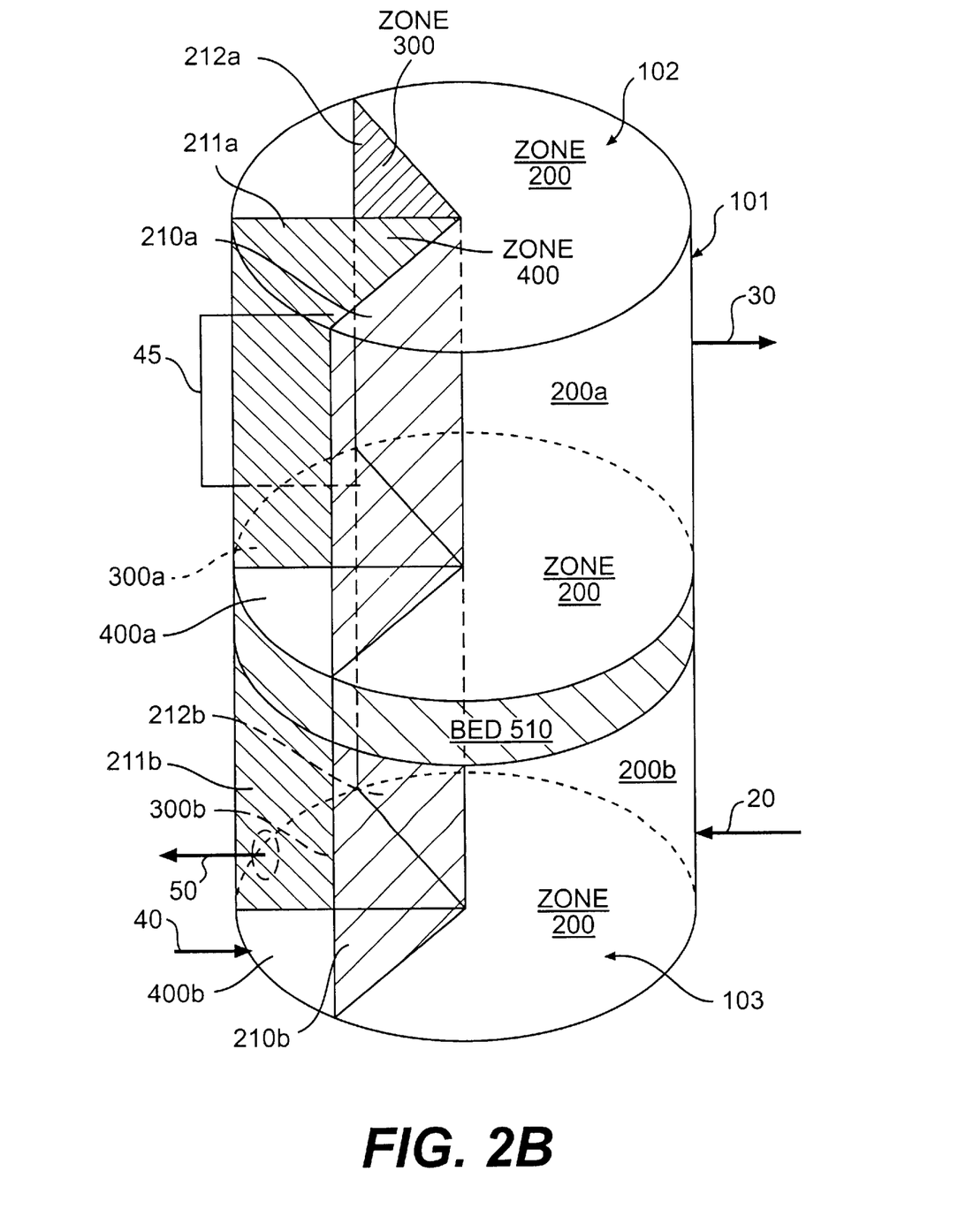
FIG. 2B is a perspective view of a regenerative VOC destroyer constructed according to the principles of the present invention, wherein the bed is divided into three processing zones; one for adsorption, one for regeneration, and one for a cool down.

Another embodiment of the present invention is shown in FIG. 2B. In this embodiment, the RVD is divided into three zones: an adsorbing zone, a regeneration zone, and a cool down zone. The bed portion enters the cool down zone after being treated in the regeneration zone and before re-entering the adsorption zone. The cool down zone serves the dual purposes of (1) cooling down the bed portion therein from the catalytically active temperatures attained in the regeneration zone and (2) heating the oxygen-containing gas stream 40.

Specifically, in FIG. 2B, the RVD comprises a vertical cylinder with wall 101, top 102 and bottom 103. A circular segment bed 510, which contains the adsorbent and catalytic processing material, can be rotated via a coaxial shaft. The structure contains radial vertical dividers above and below the bed with the capability to seal the contact area between the dividers and the bed 510. Dividers 210a,b and 212a,b define zone 200 of the bed 510 and permit the incoming contaminated gas 20 to flow through the open area 200b, through the bed segments contained by 210a,b and 212a,b, and into open area 200a as a cleaned gas. The VOC-free gas exits the structure as clean stream 30.

Dividers 211a,b and 212a,b define zone 300 which contains the portion, typically one segment, of the bed to be regenerated. Heated oxygen-containing gas 45 enters the open area 300a, passes through that portion of bed 510 contained within zone 300 to desorb and convert the VOCs therein, and finally leaves the structure via open area 300b as stream 50. The combustion products of the VOCs are carried away in stream 50

Dividers 210a,b and 211a,b define zone 400 which is the cool down zone. The oxygen-containing gas 40 enters the open area 400b of zone 400 and passes through the bed portion contained in zone 400, which is usually only one segment of the bed, and into open area 400a. The bed portion in zone 400 is hot from its previous residence in zone 300. The oxygen-containing gas is thus heated as it passes through this hot, VOC-free bed and correspondingly cools the bed to VOCs adsorption temperature levels. The heated oxygen-containing gas leaves open area 400a as stream 45 and enters open area 300a of zone 300 as described above. If additional heat is required for stream 45, electrical heating can be supplied in, for example, open area 400a.

At any one time, the majority of the segments of bed 510 are in service in zone 200 adsorbing VOCs, while one or more segments are in service in the regeneration phase, zone 300, and one or more segments are in service in the cool down phase, zone 400. The number of pie-shaped segments within bed 510 typically ranges from 3 to 12, although more segments can be used if desired. The sequence of segment service in this embodiment is as follows:

1. The majority of segments are in service as adsorption units, exposed to the flow of the relatively low temperature, contaminated gas in zone 200. Inasmuch as the temperature is low, e.g. less than about 65° C., only the adsorption component of the bed is active. The catalytic component is inactive because the temperature is below the catalytic activity temperature range.
2. The bed is rotated one segment when the adsorption wave front is close to, but has not penetrated, the bed segment with the longest exposure time.
3. The segment entering the regeneration zone 300 is subjected to a flow of preheated oxygen-containing gas, preferably air. The air is preheated by being passed through the bed segment in the subsequent cool down zone 400, which segment entered the cool down zone simultaneously with the entry of the bed segment into the regeneration zone 300. Once the adsorbed VOCs are stripped by the preheated air, the mixture enters into a reaction phase wherein the catalyst enhances the oxidation-destruction of the VOCs. The heat released by this reaction further brings this segment of the bed into its equilibrium temperature.
4. After VOCs desorption and destruction in zone 300, the regenerated bed segment is rotated into the cool down zone 400. Air is passed over the regenerated bed segment for preheating as described above. This preheating also cools the bed, which is initially hot after being in the regeneration zone 300.
5. Finally, the cool and regenerated segment is rotated back into the adsorption zone 200 where it will collect VOCs by removing them from a contaminated effluent as in 1.

The processing material 500 that is selected for use in this process and apparatus includes homogenous and heterogeneous beds of adsorbents and oxidation catalysts capable of adsorption and catalytic conversion of VOCs. A heterogeneous bed would typically contain a uniform mixture of adsorbents and catalysts, although non-uniform mixtures are contemplated. A homogenous bed is comprised of either a single layer of a material having both adsorbent and catalytic properties or multiple layers, each comprised of a single material. In the latter case, for example, a catalytic layer is placed below an adsorbent layer so that process effluent 20 flows through the materials consecutively. Typical adsorbents include the materials found in the classes of activated carbons, aluminosilicates (molecular sieves), silica gels, siliceous materials or beads, activated aluminas and bauxites, and other adsorbents where the adsorptive capacities are high at ambient temperatures and the adsorbed materials are desorbed at temperatures in the range of about 100° C. to about 350° C. Typical catalysts include rare earth elements (lanthanide series) and their compounds, transitional metals and their compounds, transitional elements and their compounds, noble metals and their compounds and other catalysts that are activated in the range of about 150° C. to about 350° C. The phrase "and their compounds" relates to compositions formed from or containing the previously named material. Examples of suitable combinations of adsorbents and catalysts are: 1) deposited transitional metal oxides on molecular sieves; 2) deposited rare earth metals and their compounds on alumina or activated carbon; 3) deposited transitional elements and their compounds on adsorption materials such as silica gel, siliceous materials, molecular sieves and the like; 4) noble metals and their compounds on adsorption materials such as alumina, silica gel, siliceous materials, molecular sieves and the like; and 5) deposited rare earth metals and their compounds on adsorptive materials such as alumina, silica gel, siliceous materials, molecular sieves, and the like.

The regenerating operations of the invention provide for a VOC removal system that functions without having to interrupt the effluent flow. Therefore the adsorption, regeneration, and optional cool down operations should proceed simultaneously to enable essentially continuous VOCs removal. Consequently, appropriate sealing arrangements are necessary to keep the flow streams between these operating zones separated. The timing and duration of the periodic desorption and conversion operations in the regeneration zone depend upon numerous design and operating conditions unique to any particular application, which are readily apparent to one of ordinary skill in the art. Such conditions include, but are not limited to, the adsorption capacity of the adsorption material, concentration and characteristics of the incoming material, effluent gas volume, processing material size and configuration, temperature and flowrate of heated gas stream, peripheral equipment capacities (fan pressures, heating capacity, heat transfer coefficients, etc.) and the like.

In addition, any number of additional operations may be performed on the effluent and/or processing material by appropriate separation of the flow streams in RVD 10. Examples of such operations are cooling of the processing material, providing separate adsorption zones for removal of different types of compounds, and multiple fluid treatments of the processing material with the same or different fluids.

The drive and regenerating operations may be automatically controlled by a computer or microprocessor programmed to control the rotation of the bed in a timed sequence, the temperature and flowrate of the heated gas stream, and other operations based upon inputs gathered from process conditions.

The following examples are set forth for the purpose of illustrating the present invention, which should not be considered as limiting the scope thereof.

EXAMPLE 1

Using an apparatus essentially as shown in FIG. 2B, an effluent was treated for the removal of toluene. The process and apparatus conditions are summarized below:

| Inlet Gas (20) | | |
| --- | --- | --- |
| Flow | 10000 CFM | |
| Temp | 27° C. | |
| Humidity | 30% RH | |
| Contaminant | Toluene | |
| Concentration | 500 PPM DV | |
| Regeneration Air (40) | | |
| Flow | 1000 CFM | |
| Temp | 27° C. | |
| Humidity | 30% RH | |
| Bed | | |
| Size | 15 ft. diameter | |
| | 18' bed depth | |
| Segments | 8 | |
| | 6 in Adsorption zone | |
| | 1 in Cool down zone | |
| | 1 in Regeneration zone | |
| Rate of Rotation | 1 Segment every 20 minutes | |
| Bed Composition | 10 inch layer of activated carbon | |
| | 6 inch layer of Pt on alumina catalyst | |
| Operating Conditions | | |
| Gas Velocity | in adsorption | 75 fpm |
| | in reaction | 82 fpm |
| | in cool down | 45 fpm to 82 fpm |
| Temperature of Bed | adsorption | 25–30° C. |
| | reaction | 210–240° C. |
| | cool down | 240° C.–40° C. |
| Space velocity | in catalyst bed | 5500 hr$^{-1}$ |

The process produced the following results:

| Outlet Gas (30) | |
| --- | --- |
| Flow | 10000 CFM |
| Temp | 25–30° C. |
| Humidity | 30% RH |
| Contaminant | Toluene |
| Concentration | 20 PPM DV |
| Regeneration Outlet Gas (50) | |
| Flow | 1760 CFM |
| Temp | 240° C. |
| Concentration-Contaminant | 0 PPM DV |
| System Pressure drop | 8 m.w.g. |

EXAMPLE 2

Using an apparatus essentially as shown in FIG. 2B, an effluent was treated for the removal of butyraldehyde. The process and apparatus conditions are summarized below:

| Inlet Gas (20) | | |
| --- | --- | --- |
| Flow | 5000 CFM | |
| Temp | 30° C. | |
| Humidity | 60% RH | |
| Contaminant | Butyraldehyde | |
| Concentration | 300 PPM DV | |
| Regeneration Air (40) | | |
| Flow | 400 CFM | |
| Temp | 25° C. | |
| Humidity | 30% RH | |
| Bed | | |
| Size | 12 ft. diameter | |
| | 15 inch bed depth | |
| Segments | 8 | |
| | 6 in adsorption zone | |
| | 1 in cool down zone | |
| | 1 in regeneration zone | |
| Rotation | 1 Segment every 25 minutes | |
| Bed Composition | 9 inch layer of molecular sieve-absorbent | |
| | 6 inch layer of Pd on silica catalyst | |
| Operating Conditions | | |
| Gas Velocity | adsorption | 70 fpm |
| | reaction | 65 fpm |
| | in cool down | 34 fpm to 65 fpm |
| Temperature of Bed | adsorption | 30–35° C. |
| | reaction | 275–290° C. |
| | cool down | 290° C.–40° C. |
| Space velocity in catalyst | | 4200 hr$^{-1}$ |

The process produced the following results:

| Outlet Gas (30) | |
| --- | --- |
| Flow | 10000 CFM |
| Temp | 30–35° C. |
| Humidity | 60% |
| Conc. Contaminant | 10 PPM VD Butyraldehyde |
| Regeneration Outlet Gas (50) | |
| Flow | 1915 CFM |
| Temp | 285° C. |
| Contaminant Conc. | 0 Contaminant |
| Pressure Drop | 7 m.w.g. |

The invention having been thus described, it will be obvious that the same may be varied in numerous ways by workers skilled in this art without departing from the spirit and scope of the invention. All such variations are included in the present invention as defined in the following claims.

What is claimed is:

1. A method for destroying volatile organic compounds in a effluent from an industrial or commercial process, which comprises:

passing an effluent which contains volatile organic compounds over a section of a bed which contains a physical admixture of a catalyst material and an adsorbant or contains two physically separated layers of a catalytic material and an adsorbant material, to adsorb the volatile organic compounds; and passing an oxygen-containing gas over another section of said bed to desorb and catalytically destroy the organic compounds collected therein.

2. The method of claim 1, wherein the effluent and a heated oxygen-containing gas are sequentially directed to various portions of the bed.

3. The method of claim 2, wherein the steps are performed in sealed zones within a housing in which the bed is supported for rotation relative to the effluent and oxygen-containing gas streams.

4. The method of claim 3, wherein the zones are stationary and further comprising the step of rotating the bed in the housing to periodically subject all portions of the bed to the effluent and oxygen-containing gas streams.

5. The method of claim 1, wherein both steps of passing the effluent and the oxygen containing gas are occurring simultaneously.

6. The method of claim 1, which further comprises heating said oxygen-containing gas prior to passing it over the portion of the bed which contains volatile organic compounds, by passing said oxygen-containing gas over a hot portion of said bed which does not contain any volatile organic compounds.

7. The method of claim 6, wherein said hot section of the bed is formed by said step of passing heated oxygen-containing gas over a section of said bed containing volatile organic compounds.

8. The method of claim 1, wherein the adsorbent has adsorptive capacities at ambient temperatures and desorbs volatile organic compounds at temperatures in the range of about 100 to about 350° C., and the catalyst is an oxidation catalyst that is active in the range of about 150° C. to about 350° C.

9. The method of claim 1, wherein the adsorbent material comprises at least one adsorbent selected from the group consisting of activated carbons, aluminosilicates, siliceous materials, activated aluminas and bauxites.

10. The method of claim 9, wherein said siliceous materials are selected from silica gels.

11. The method of claim 9, wherein said siliceous materials are in the form of siliceous beads.

12. The method of claim 1, wherein the catalytic material comprises at least one material selected from the group consisting of rare earth metals and their compounds, transitional elements and their compounds, and noble metals and their compounds.

13. The method of claim 1, wherein the bed material comprises a catalyst layer containing a catalyst selected from deposited transitional metal oxides and their compounds and an adsorbent layer containing at least one adsorbent selected from the group consisting of activated carbons, aluminosilicates, siliceous materials activated aluminas and bauxites.

14. The method of claim 1, wherein the bed material comprises a catalyst layer containing a catalyst selected from deposited rare earth metals and their compounds and an adsorbent layer containing at least one adsorbent selected from the group consisting of activated carbons, aluminosilicates, siliceous materials, activated aluminas and bauxites.

15. The method of claim 1, wherein the bed material comprises a catalyst layer containing a catalyst selected from deposited transitional elements and their compounds and an adsorbent layer containing at least one adsorbent selected from the group consisting of activated carbons, aluminosilicates, siliceous materials, activated aluminas and bauxites.

16. The method of claim 1, wherein the bed material comprises a catalyst layer containing a catalyst selected from deposited noble metals and their compounds and an adsorbent layer containing at least one adsorbent selected from the group consisting of activated carbons, aluminosilicates, siliceous materials, activated aluminas and bauxites.

17. The method of claim 1, wherein the bed comprises homogeneous layers of adsorbent material and catalytic material.

18. The method of claim 1, wherein the bed comprises a heterogeneous mixture of adsorbent and catalytic material.

19. The method of claim 1, wherein said adsorbent is an activated carbon.

20. The method of claim 19, wherein said adsorption is carried out at ambient temperatures and said desorption and catalytic destruction of VOCs is carried out with heated oxygen-containing gas at a bed temperature of about 150° to 350° C.

* * * * *